Patented Aug. 28, 1928.

1,682,269

UNITED STATES PATENT OFFICE.

FITZGERALD DUNNING AND EBENEZER EMMET REID, OF BALTIMORE, MARYLAND, ASSIGNORS TO HYNSON, WESTCOTT & DUNNING, OF BALTIMORE, MARYLAND, A FIRM.

PROCESS FOR THE PRODUCTION OF PRIMARY STIBINIC ACIDS.

No Drawing. Application filed January 6, 1927. Serial No. 159,499.

The object of the present invention is to provide an improved process for the production of primary stibinic acids, i. e., compounds of the type $R-SbO_3H_2$, in which R represents an aromatic residue substituted or not, and more particularly for the production of stibanilic acid (p-amino-phenylstibinic acid,

Stibanilic acid has been made heretofore by processes involving the diazotization of acetyl-p-phenylene-diamine (p-amino-acetanilide), combining the diazo compound with antimony trichloride, breaking down the resulting diazo antimony compound and hydrolyzing off the acetyl group. Processes involving this general procedure are unsatisfactory because in the decomposition of the diazo antimony compound a voluminous and stiff foam is formed which is very difficult to handle and the yields of the stibanilic acid are low.

We have devised a process for the production of stibanilic acid according to which a relatively high yield, 65 percent or more of the theoretical, may be obtained and in which the difficulties due to foaming are largely eliminated. The process is adapted to relatively large scale production.

In accordance with our invention the diazo antimony compound is decomposed and the acetyl group simultaneously hydrolyzed off by treatment with caustic soda at a relatively high temperature. The process is illustrated by the following specific example:

1 mole (150 g.) of p-amino-acetanilide and ½ mole (145 g.) of antimony trioxide ($Sb_2O_3$) are dissolved in sufficient concentrated (e. g. 30%) hydrochloric acid to prevent antimony oxychloride from precipitating. This solution, which may contain crystals of the hydrochloride of the p-aminoacetanilide, is diazotized with sodium nitrite, e. g., at 15% solution containing 70 g. of $NaNO_2$ in 460 cc. of water, by delivering the sodium nitrite solution through a capillary tube into bottom of the body of the hydrochloric acid solution of the p-amino-acetanilide and antimony oxide, while the latter is vigorously and continuously stirred. A yellow crystalline molecular diazo antimony compound having probably the formula:

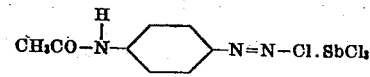

separates out and is filtered off and suspended in water and the suspension is run slowly and in small portions into a 10% solution of 420 g. of caustic soda heated to 90° C. The solution foams vigorously upon each addition of the suspension, but the foam is not stiff and quickly breaks down. When all of the suspension has been added and the reaction is complete, the reaction mixture is almost neutralized and then treated with carbon dioxide to precipitate impurities. The solution is then filtered and acidified with acetic acid when a white amorphous product, p-amino-phenylstibinic or stibanilic acid is precipitated.

The procedure illustrated in the foregoing example, the main feature of which is the decomposition of the diazo antimony compound by means of hot caustic soda, is capable of considerable variation, for instance, with respect to the formation of the diazo antimony compound and with respect to the temperature and concentration of the caustic soda solution. The diazo antimony compound may be formed in any known or suitable way without departing from our invention and the concentration of the caustic soda solution may be varied, so long as the essential feature, i. e., the use of a hot solution (between 85° and 100° C.) of caustic soda, as distinguished from previously employed cooled solutions, is adhered to, without departing from our invention as defined in the appended claims.

As has been indicated the procedure is applicable with advantage in the production of primary stibinic acids other than stibanilic acid, although it is for the preparation of this compound that the process is particularly important at the present time. For the preparation of other stibinic acids, for instance phenyl stibinic acid, the procedure described in the foregoing example may be followed, merely substituting for the p-aminoacetanilide a corresponding quantity, 93 g., of aniline.

We claim:

1. Process for the production of primary stibinic acids of the general formula

R—SbO₃H₂ in which R stands for an aromatic residue, substituted or not, which comprises diazotizing a primary amine and combining the diazo compound with an antimony salt in an acid reaction medium, and decomposing the diazo antimony compound so formed by treating it with a hot caustic alkali solution.

2. Process for the production of stibanilic acid, which comprises diazotizing a solution of acetyl-p-phenylene-diamine and antimony oxide in hydrochloric acid, and decomposing the resulting diazo antimony compound in a hot caustic alkali solution.

3. Process for the production of stibanilic acid, which comprises dissolving acetyl-p-phenylene-diamine and antimony oxide in hydrochloric acid, diazotizing the solution with sodium nitrite, separating the resulting insoluble diazo-antimony compound, and introducing said diazo-antimony compound into a hot aqueous solution of caustic alkali.

4. Process for the production of stibanilic acid as defined in claim 3 in which the diazo-antimony compound in an aqueous suspension is introduced into a solution of caustic soda maintained at about 90° C.

5. Process for the production of primary aromatic stibinic acids which comprises decomposing an aromatic diazo-antimony compound by means of a caustic alkali solution at a temperature of at least about 85° C.

6. Process for the production of stibanilic acid, which comprises decomposing the diazo-antimony compound of p-amino-acetanilide by means of a caustic alkali solution at a temperature of from 85° to 100° C.

In testimony whereof, we affix our signatures.

FITZGERALD DUNNING.
EBENEZER EMMET REID.